Figure 1:
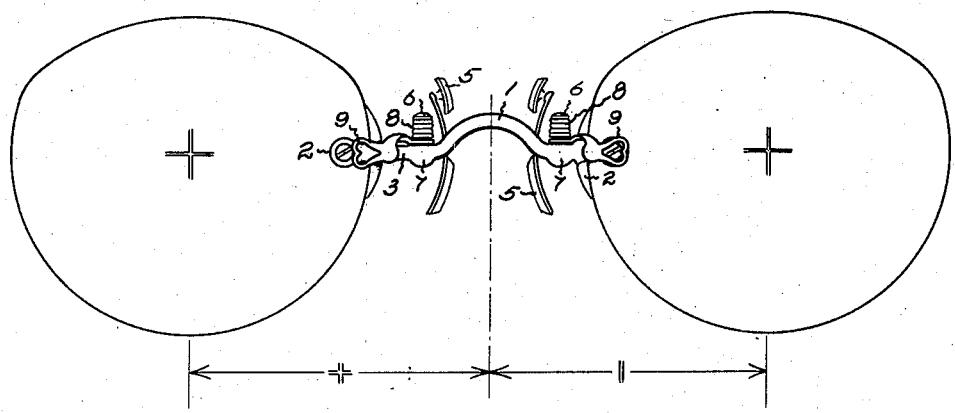

W. D. FENNIMORE.
EYEGLASS MOUNTING.
APPLICATION FILED JULY 31, 1913.

1,121,555.

Patented Dec. 15, 1914.

WITNESSES:
C. C. Vance
E. B. Kelly

INVENTOR.
Watson D. Fennimore
BY
Baldwin Vale
ATTORNEY

THE NORRIS PETERS CO., PHOTO-LITHO., WASHINGTON, D. C.

UNITED STATES PATENT OFFICE.

WATSON D. FENNIMORE, OF SAN FRANCISCO, CALIFORNIA.

EYEGLASS-MOUNTING.

1,121,555.   Specification of Letters Patent.   Patented Dec. 15, 1914.

Application filed July 31, 1913. Serial No. 782,353.

*To all whom it may concern:*

Be it known that I, WATSON D. FENNIMORE, residing in the city and county of San Francisco, State of California, have invented certain new and useful Improvements in Eyeglass-Mountings; and I do hereby declare the following to be a full, clear, and exact description of the said invention, such as will enable others skilled in the art to which it most nearly appertains to make, use, and practice the same.

This invention relates to improvements in eyeglass mountings, and more particularly to what is known in the art as "finger piece" eyeglasses.

Among the objects sought to be accomplished, are to provide a finger piece mounting, capable of fitting anatomical inequalities in the face of the wearer; whereby the centers of the lenses, may be mounted to coincide with the exact pupilary centers of the respective eyes of the wearer, irrespective of differences of distance, that may exist between either eye center and the center of the nose.

Another object is to provide a mounting having an integral bridge bar, extending from strap to strap of the respective lenses.

Other objects and advantages will appear as the description progresses.

The invention possesses other advantageous features, that with the foregoing will be set forth at length in the following description, wherein I shall outline in full, that form of the invention selected for illustration in the drawings accompanying and forming part of the present specification.

The novelty of the invention will be included in the claims succeeding said specification. From this it is apparent that I do not restrict myself, to the showing made by said drawings and specification, as I may adopt many variations within the spirit of this invention, as expressed in said claims.

Figure 2:
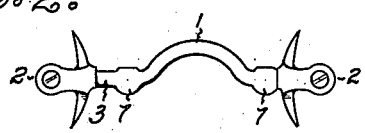
Figure 3:
Figure 4:
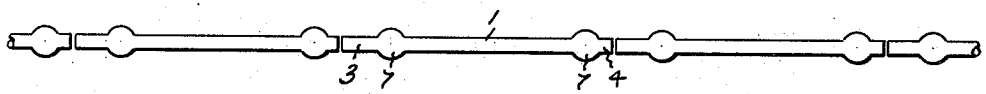
Figure 5:
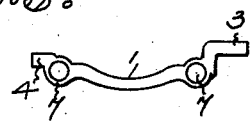
Figure 6:

In the accompanying drawings, Figure 1— is an enlarged front elevation of a pair of eyeglasses with finger piece mountings, illustrating a bridge bar constructed in accordance with this invention, and incorporated in the mounting for the lenses. Fig. 2— is a detail in front elevation of the bridge bar and lens straps, combined. Fig. 3— is a similar view of the bridge bar, formed and ready for combination with the other elements of the mounting. Fig. 4— is a detail of a bridge bar blank, suitably swaged and cut into lengths, to form bridge bars with unequal studs on either end. The long stud can be made up for either the right or left side, by selection before the bridge bar is finally shaped. Fig. 5— is a plan view from above of the bridge bar, showing the unequal studs, offset to bring the lenses close to the eye of the wearer. One stud being offset more than the other. Fig. 6— is a similar view of the same, except that one stud is offset forward, and the other backward; illustrating the adaptability of the bridge bar, to meet unusual demands without departing from the spirit of this invention.

The finger piece eyeglass mounting comprises the bridge bar 1, having the lens straps 2—2, soldered or otherwise attached to the studs 3—4, of unequal length, on either the right or left side of the bridge bar. The nose guards 5—5, are pivoted on the post screws 6—6, screwed into the swaged bosses 7—7 of the bridge bar. The necessary frictional tension of the guards against the nose of the wearer, is accomplished by the coil springs 8—8, encircling these posts, and expanding against the guards and the bridge bar. The tension of these springs is overcome by the finger pieces 9—9, forming part of the guards, and extending forward of the mounting, within reach of the wearer; for placing and removing the eyeglasses.

An eyeglass mounting must be compact, rigid, strong and inconspicuous; yet easily manipulated and formed to fit the idiosyncrasies in the facial anatomy of the wearer. It is very rare, that an individual will have eyes spaced equidistant, on each side of the center line of the nose, which is the base or center from which mountings are calculated.

The term rigid means without spring and incapable of bending or being adjusted without the use of tools and the exertion of considerable force; beyond that which the handling of the eye glass without tools would stand.

In the earlier forms of mountings, wherein the assemblage was made up of a spring bridge, having lens straps with studs screwed to the bridge, straps with unequal studs could readily be incorporated in the combination. In the present form of finger piece mounting, this latitude of adjustment is not permissible within the limitations above set forth. The studs are too small to allow for any satisfactory adjustability in length, without unsightly enlargement. The strain on the mounting, in handling the eyeglasses by the finger pieces, demands a strong rigid structure, precluding any negatively built up, or screwed together bridge bar between the lenses.

In the present invention, particular novelty resides in the homogeneous bridge bar, having studs of unequal length, integrally combined with the lens straps. Integrally, in the present sense including fusing, soldering, or otherwise permanently attaching the straps to the bridge bar, to form an integral bridge between the lenses. The unequal length of the studs is illustrated in Fig. 1, by the plus and minus dimentional lines; the crosses in the lenses indicating the centers thereof, which should coincide with the pupilary centers of the eyes of the wearer. These points are determined by measuring the face of the wearer, with a suitable instrument, using the center line of the nose, and the center of the bridge bar as bases, in making up suitable mountings for the facial measurements.

Having thus fully described this invention, what is claimed and desired to secure by Letters Patent is:—

1. A finger piece mounting for eye glasses including a rigid bridge bar, having rigid, integral studs of unequal length.

2. A finger piece mounting for eye glasses, including a curved bridge bar, having straight, integral studs of unequal length.

3. A bridge bar for eye glass mountings having integral embossments, at equal distances from the center thereof; and integral end studs of unequal length.

4. A bridge bar for eye glass mountings, having integral embossments at equal distances from the center thereof; and integral end studs of unequal length and off-set from the plane of said bridge bar.

5. A bridge bar for eye glass mountings, having integral embossments at equal distances from the center thereof; and integral end studs off-set from the plane of said bridge bar.

6. A rigid bridge bar for eye glass mountings, having integral embossments at equal distances from the center thereof; and integral, rigid end studs of unequal length.

7. A finger piece mounting for eye glasses, including a curved rigid bridge bar; integral embossments on said bridge bar equal distances from the center thereof; and integral end studs of unequal length, extending in a straight line from said embossments to the lens straps of said mountings.

In testimony whereof, I have hereunto set my hand this 25th day of July 1913.

WATSON D. FENNIMORE.

Witnesses:
    BALDWIN VALE,
    C. E. VANCE,
    E. B. KELLY.

Copies of this patent may be obtained for five cents each, by addressing the "Commissioner of Patents, Washington, D. C."